Sept. 7, 1926.                J. S. WHEELER                 1,598,903
                              BENDING MACHINE
                        Filed Jan. 2, 1925      8 Sheets-Sheet 4
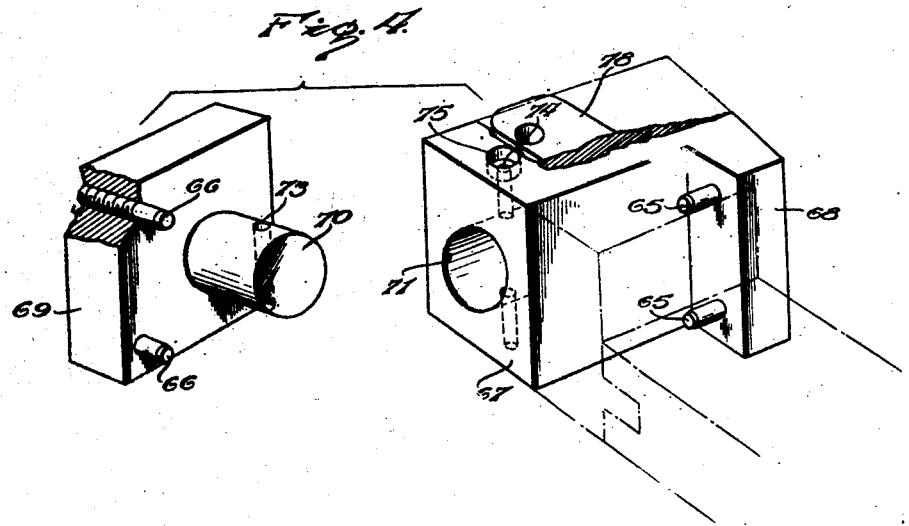
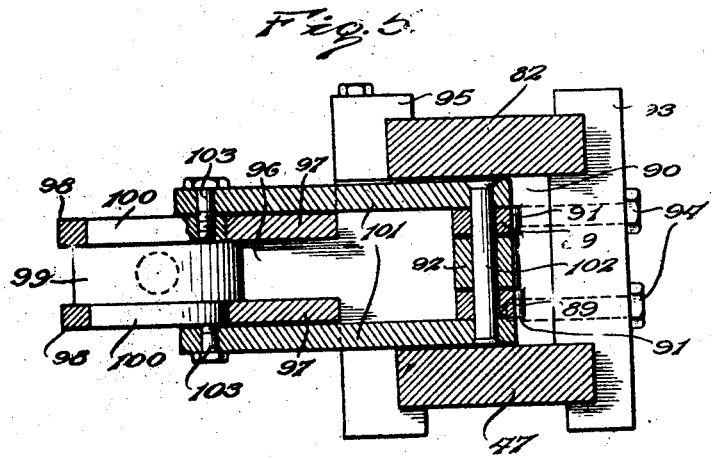
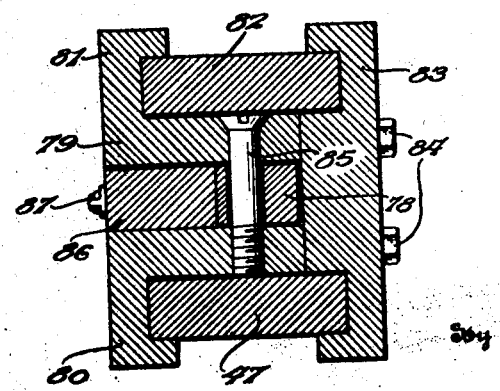
Inventor
John S. Wheeler
by Lacey & Lacey, Attorneys Sept. 7, 1926. 1,598,903
J. S. WHEELER
BENDING MACHINE
Filed Jan. 2, 1925 8 Sheets-Sheet 5
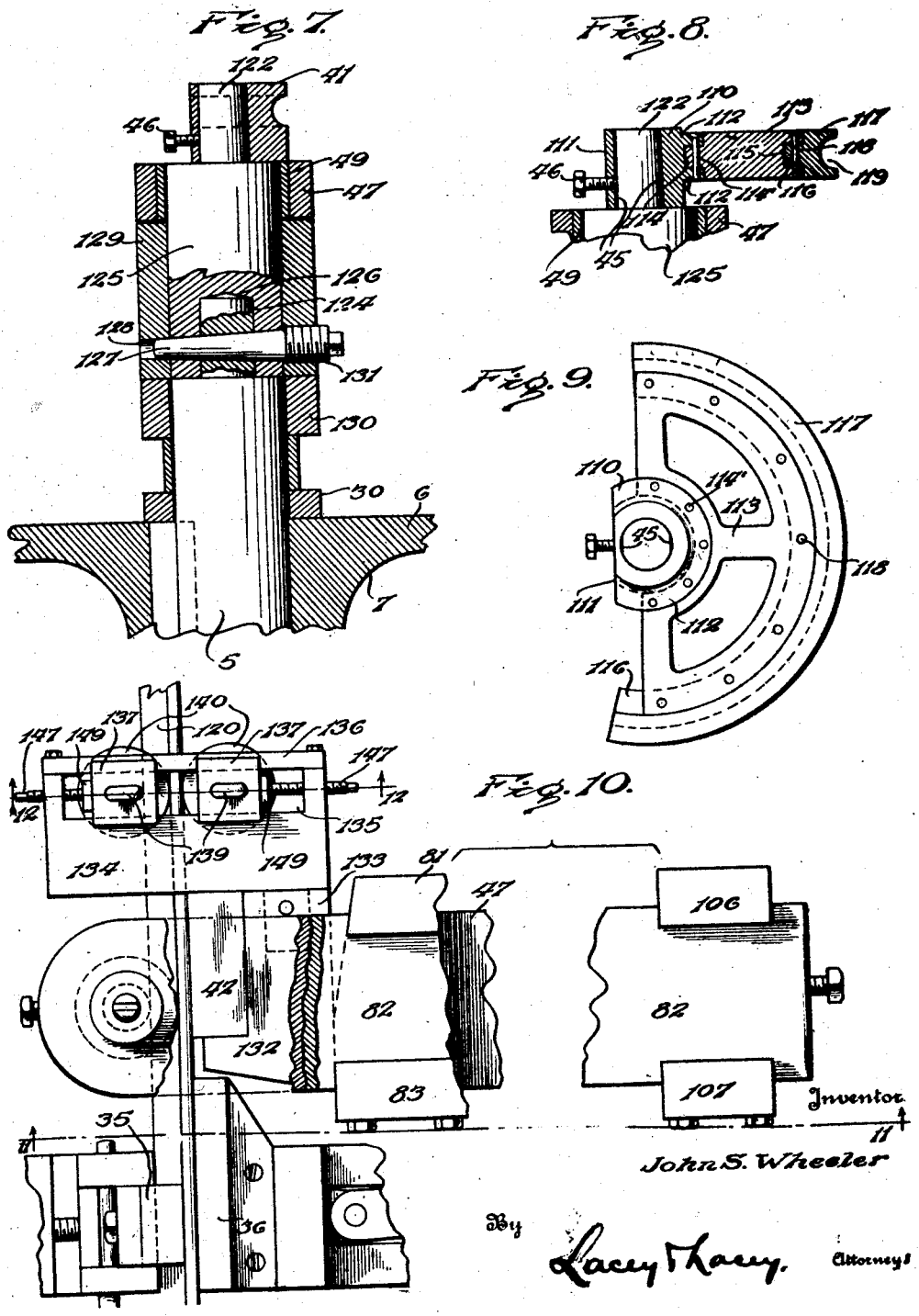

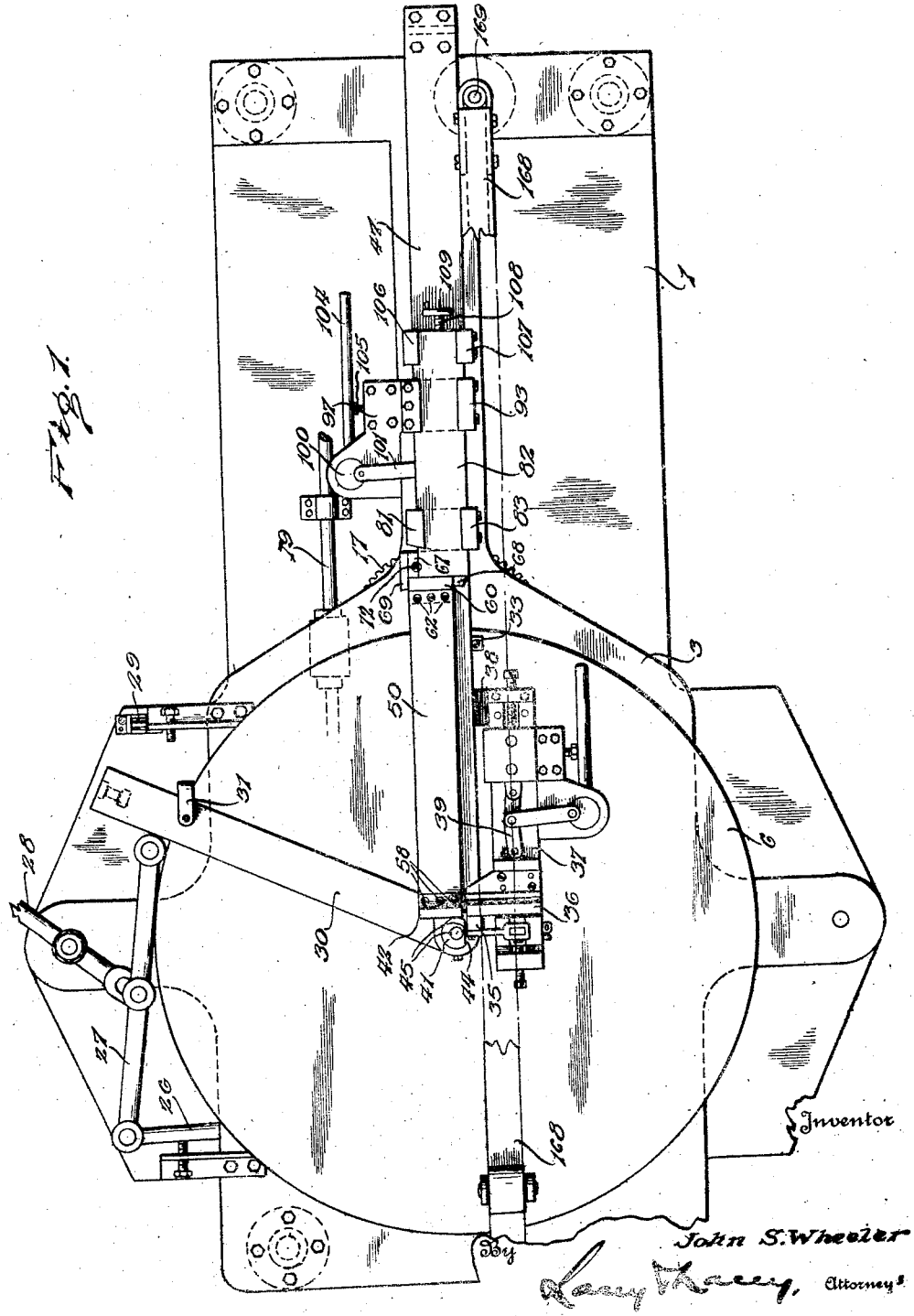

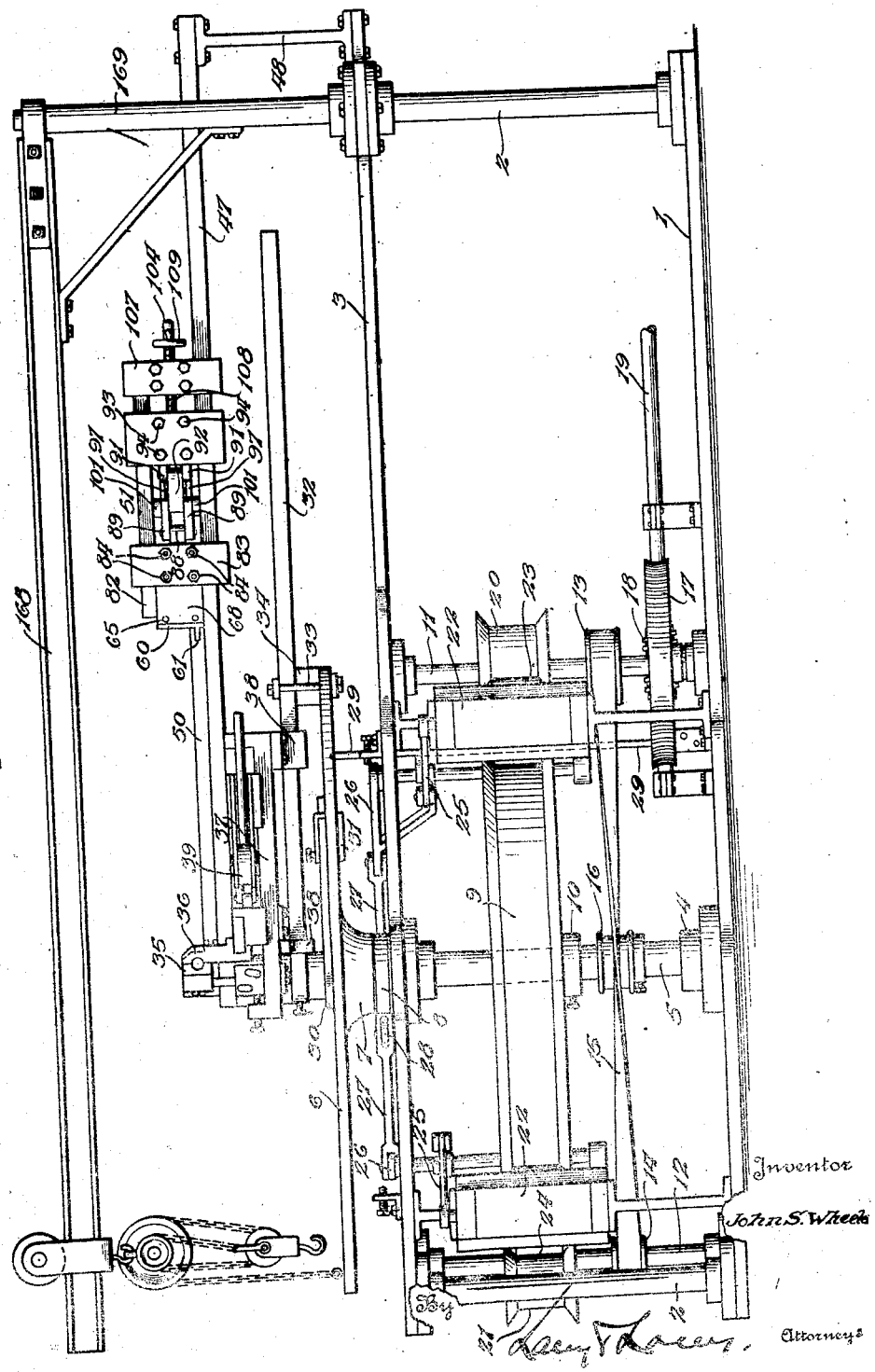

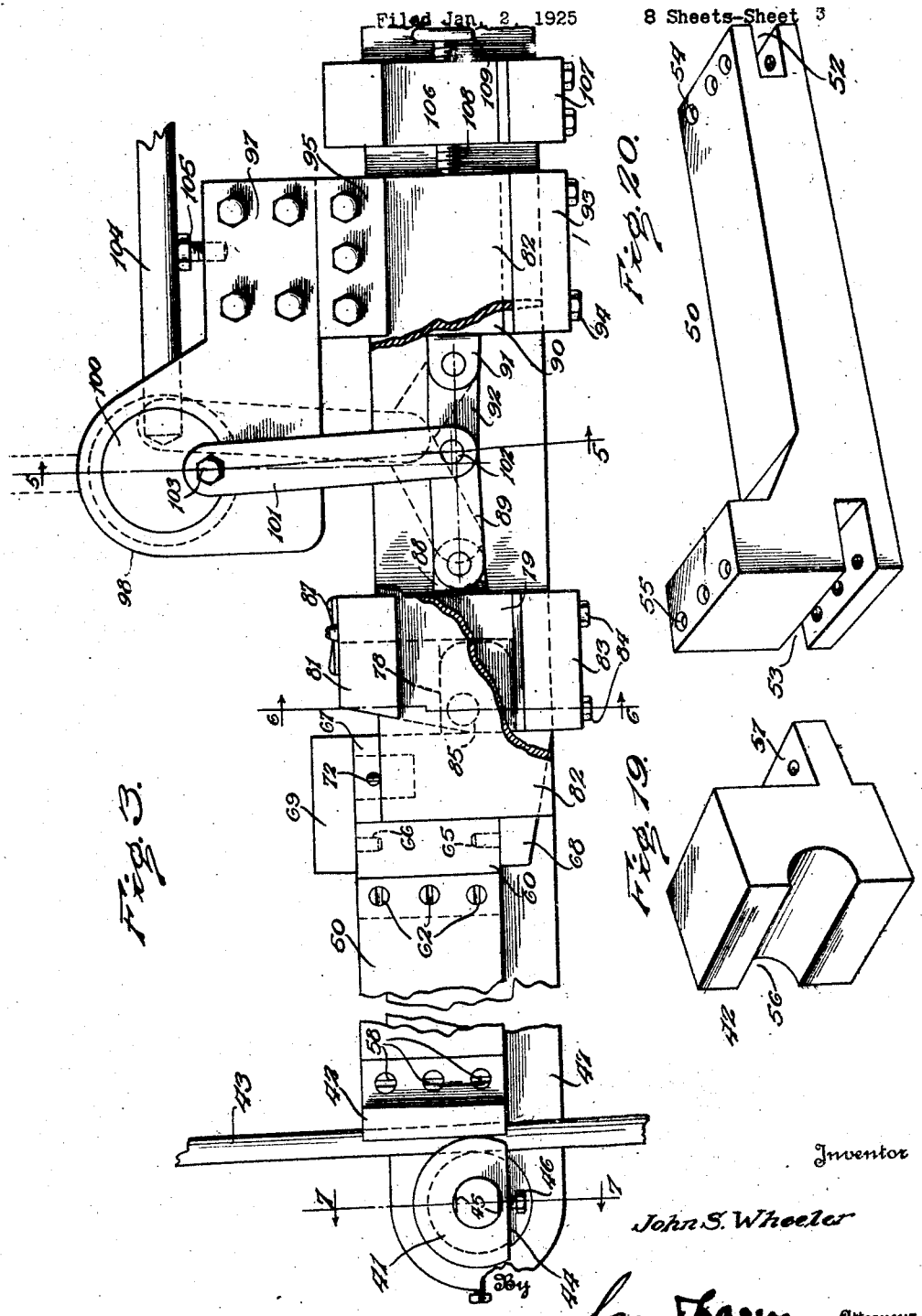

Sept. 7, 1926.  J. S. WHEELER  1,598,903

BENDING MACHINE

Filed Jan. 2, 1925    8 Sheets-Sheet 6

Inventor
John S. Wheeler
By Lacey & Lacey, Attorneys

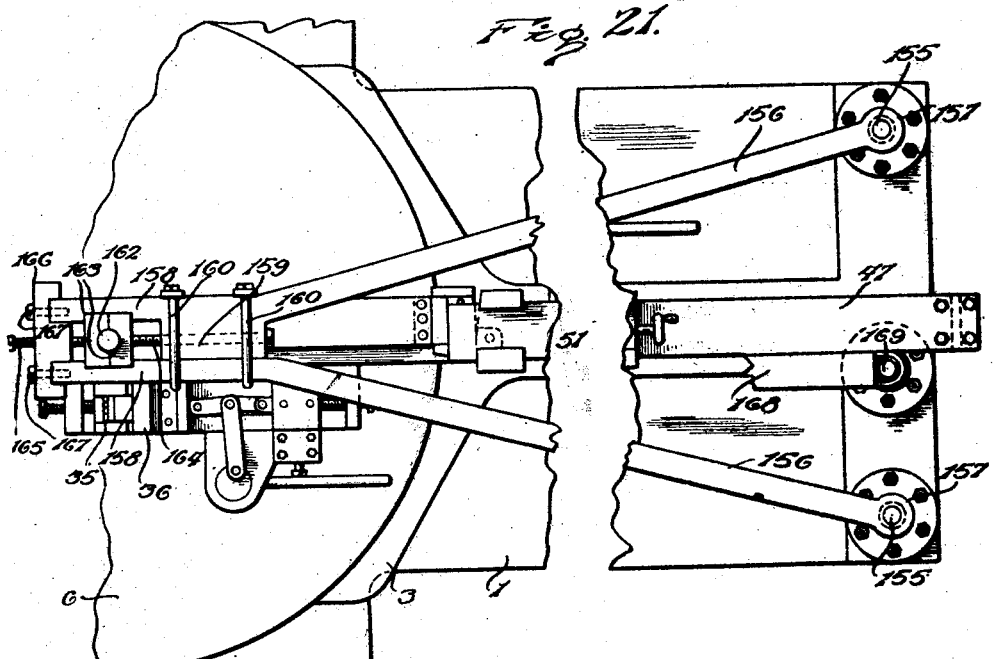
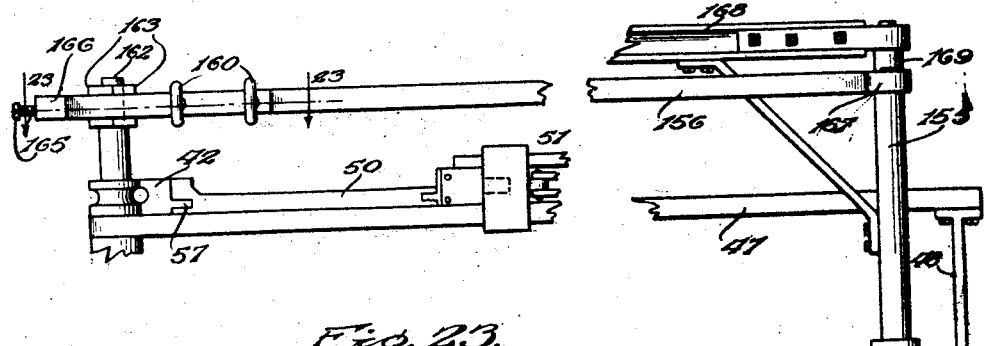
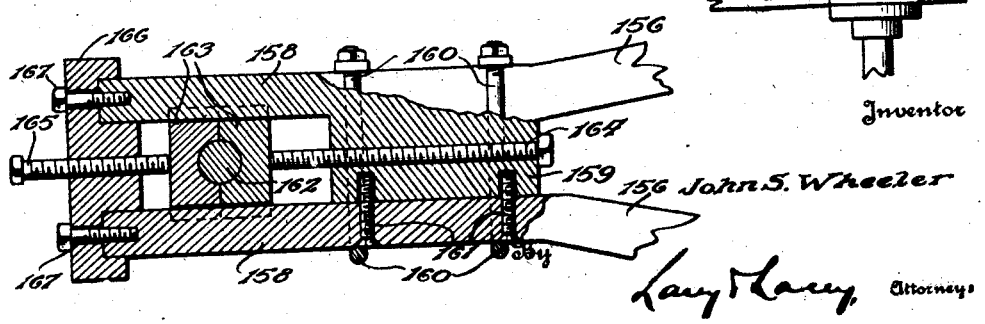

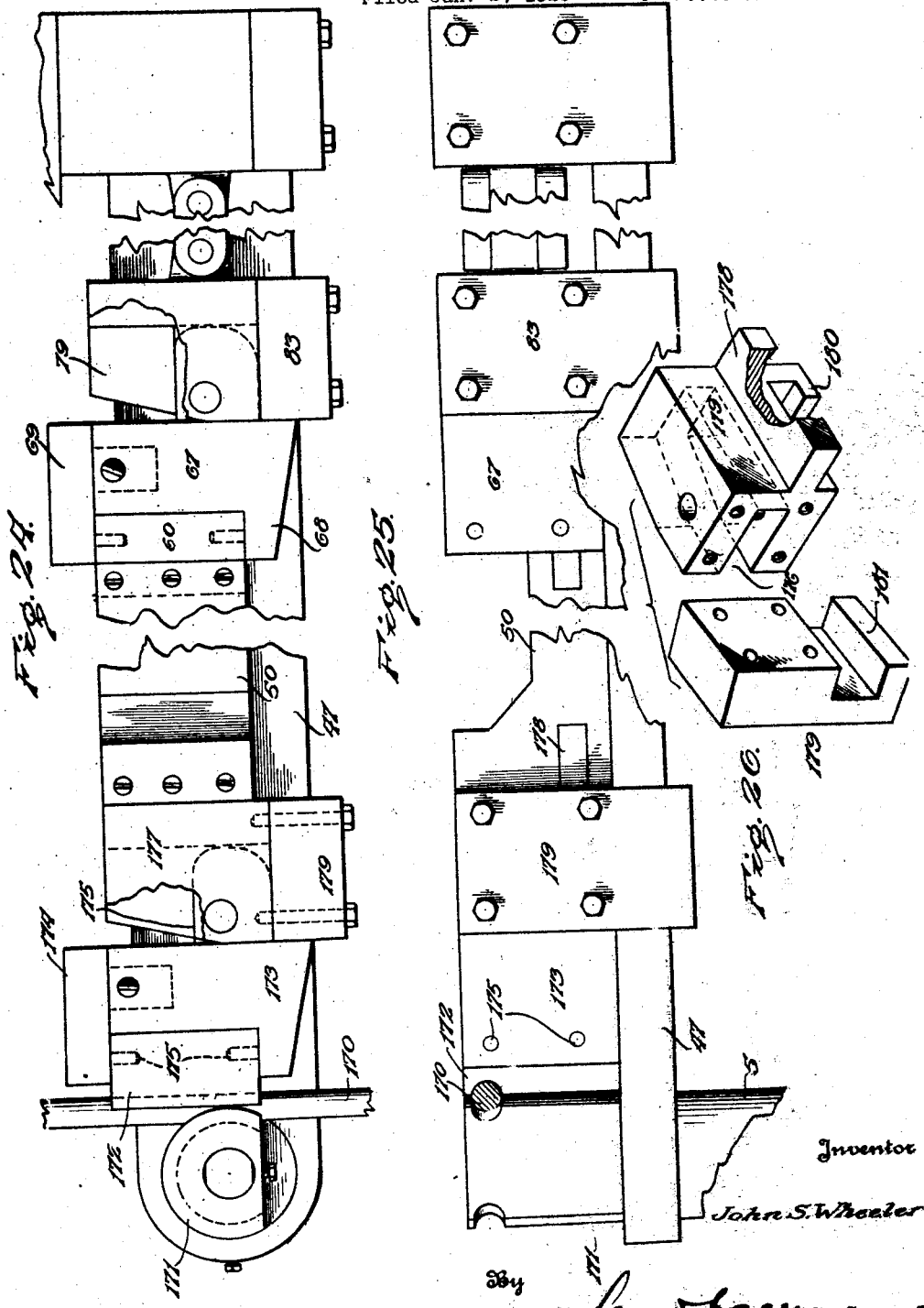

Patented Sept. 7, 1926.

1,598,903

UNITED STATES PATENT OFFICE.

JOHN S. WHEELER, OF LOS ANGELES, CALIFORNIA.

BENDING MACHINE.

Application filed January 2, 1925. Serial No. 163.

This invention relates to machines for bending rods, pipes or bars and has for its object the provision of a machine in which bars, rods or pipes may be bent into any desired shape expeditiously and with minimum labor on the part of the operator. A particular object of the present invention is to provide means whereby a rod or bar or pipe may be bent into coils with the turns or bends of the coils close together and to accommodate the formed coils without causing them to interfere with the operating mechanism. The invention also has for its object the provision of novel means whereby pressure may be applied to the work, and also to provide a construction which will permit the several working elements to be quickly adapted to different forms of work. The invention also has for an object the provision of means whereby the machine will be stable while in use and will, as a result, be found durable. The invention also seeks to provide a structure which will be thoroughly reinforced and braced, and seeks generally to improve the construction, arrangement and operation of metal-bending machines to the end that the life of the machine may be prolonged and the cost of maintenance and operation reduced. The invention is illustrated in the accompanying drawings and will be hereinafter fully set forth.

In the drawings:

Figure 1 is a plan view of one embodiment of the invention;

Fig. 2 is a side elevation of the same;

Fig. 3 is an enlarged plan view, partly broken away, of the pressure mechanism;

Fig. 4 is a view showing the parts of the pressure-jaw holder in perspective and disassembled;

Fig. 5 is a transverse section on the line 5—5 of Fig. 3;

Fig. 6 is a transverse section on the line 6—6 of Fig. 3;

Fig. 7 is an enlarged sectional elevation of a portion of the main shaft of the machine showing one species of form block mounted thereon;

Fig. 8 is a similar view showing another construction of form block;

Fig. 9 is a plan view of the structure shown in Fig. 8;

Fig. 10 is an enlarged plan view showing additional elements which are provided to bend angle bars;

Fig. 19 is a detail perspective view of another form of work-engaging jaw;

Fig. 20 is a detail perspective view of an extension bar which may be employed;

Fig. 21 is a plan view showing a bracing and reinforcing structure which may be employed when bending heavy work;

Fig. 22 is a side elevation of the structure shown in Fig. 21;

Fig. 23 is an enlarged detail horizontal section on the line 23—23 of Fig. 22;

Fig. 24 is a plan view of a manner of mounting the pressure block different from that shown in Fig. 3;

Fig. 25 is a side elevation of the arrangement shown in Fig. 24, and

Fig. 26 is a view showing in perspective certain elements appearing in Figs. 24 and 25.

Figure 11:
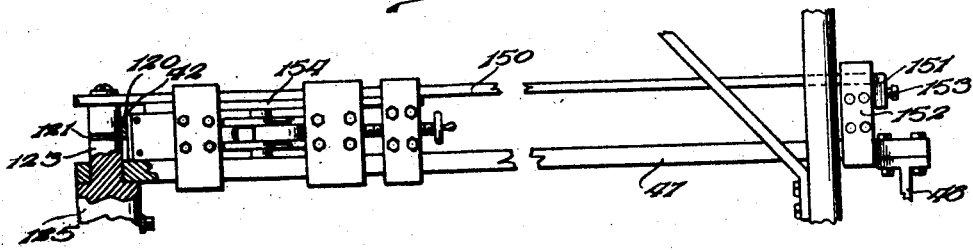
Fig. 11 is a side elevation with parts in section on the line 11—11 of Fig. 10.

In building a machine in accordance with my invention, a bed plate 1 is provided of suitable form and dimensions to support the entire structure. Upon this bed plate are secured posts 2 in any desired number, and these posts carry a bench 3 which will be of convenient form to brace the structure and provide a support for some of the working parts while permitting the operator to reach all the parts which may need manipulation or adjustment. Also disposed upon the bed plate, adjacent one end of the same, is a bearing 4 in which is received the lower end of the main driving shaft 5, the said shaft extending upwardly through the bench 3 and having rigidly secured to it above the bench a circular plate 6, the hub 7 of which rests upon an anti-friction bearing, indicated at 8, which is secured upon the bench around the main driving shaft. The working parts of the machine are connected with this circular plate 6 and with the shaft above the plate and the entire weight of the working elements of the machine is carried by the bearing 8. Secured to the main driving shaft below the bench is a large friction pulley or wheel 9, a collar 10 being secured to the shaft below the said friction wheel so as to aid in carrying the weight of the same. Mounted in suitable bearings upon the bed plate and the bench 3 are vertical shafts 11 and 12 which are arranged at opposite sides of the friction wheel 9, and secured to these shafts 11 and 12 are flanged pulleys 13 and 14 respectively, a crossed belt 15 being trained about the said pulleys and an idler pulley 16 being loosely mounted upon the shaft in position to be engaged by the belt so as to prevent wear between the belt and the shaft. Upon the lower portion of one of the shafts 11 or 12 is a worm gear 17 with which meshes a worm 18 upon a power shaft 19 which may be actuated from any convenient motor. Upon each shaft 11 and 12 are secured friction pulleys 20, 21, and between the shafts and the friction wheel 9 are frames 22 suitably supported between the bed plate and the bench and having mounted therein movable friction pulleys, indicated at 23 and 24, which are adapted to transmit the motion of the pulleys 20 or 21 to the wheel 9 so that the main shaft 5 and the parts connected therewith may be driven in one or the other direction. The friction pulleys 23 and 24 are mounted in the frames 22 so as to slide lengthwise of the same and, consequently, may be readily adjusted toward or from the respective pulleys 20 and 21, and it will be understood that, if the pulley 23, for instance, is moved inwardly toward the pulley 20 to engage the same, the wheel 9 will be rotated in one direction while, if the said pulley 23 be adjusted outwardly and the pulley 24 be moved inwardly to engage the pulley 21, the wheel 9 will be rotated in the opposite direction. Pitmen 25 are mounted adjacent the respective frames 22 below the bench and connected with the axles of the pulleys 23 and 24 so as to adjust the same, and these pitmen are controlled by levers 26 and a connecting rod 27 which are so disposed that they may be conveniently manipulated by the workman through a handle 28 supported on the bench and connected with the connecting rod 27, as shown most clearly in Fig. 1. The details of the driving friction gearing and the means for adjusting the same are not clamed in this application and hence are not more fully disclosed.

I also provide means for automatically stopping the rotation of the working elements when a bend has been completed. For this purpose, I provide a spring bar 29 which is secured at its lower end upon the bed plate 1 and is disposed adjacent the link 27 and the parts connected therewith so that it may act thereon. Pivotally fitted about the shaft 5 immediately over the circular plate or table 6 is a stop arm or bar 30 which extends radially beyond the said plate and may be clamped to the same at any point of its periphery by a convenient clamp 31. In the operation of the machine, this stop arm or bar 30 will be set at the proper point of the turntable according to the degree of bend which it is desired to make in the work. The table 6 and the working parts will then rotate to make the bend, and eventually the rotation of the plate to which the stop arm has been firmly secured will bring the free end of the stop arm against the spring lever 29 so that the said lever will be rocked outwardly. As soon as the stop arm clears the lever, the latter will spring backward and will strike the adjacent lever 26 so as to throw the same to the inoperative position.

Disposed above the table 6 and secured to the main shaft 5 is a bar 32 which may project radially beyond the table to any desired extent and is rigidly connected with the table by clamping bolts 33, as shown in Fig. 2, a filler block 34 being interposed between the bar and the table so as to prevent bending of the bar at the clamp. This bar 32 carries the work-holder which consists essentially of cooperating jaws 35 and 36 mounted upon a base bar 37, which, in turn, is secured rigidly to the bar 32 by clamps 38 so that the work-holder will be firmly supported and will be forced to move with the said carrying bar 32 in the operation of the machine. The work-holder also includes clamping means, indicated generally at 39, for holding the two jaws 35 and 36 firmly about the work, but the details of this mechanism are not more fully disclosed herein inasmuch as they will form the subject-matter of a separate application. It is to be noted, however, at this point that the cooperating opposed faces of the jaws 35 and 36 are disposed adjacent the form 41 and the pressure jaw 42, although they are eccentric to said form and said pressure jaw whereby a bar or tube to be bent may be engaged by the form 41, the jaw 42 and by the jaws in the work-holder. In Fig. 3, I have indicated a bar 43 passing between and held by the form 41 and jaw 42.

Figure 18:
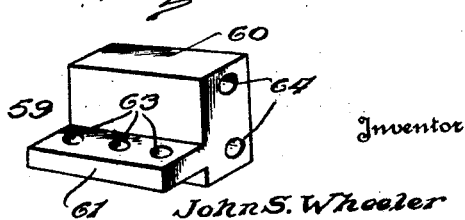
Fig. 18 is a detail perspective view of an anchor block which is employed in some embodiments of the invention.

The form 41 is carried directly by the upper end of the main shaft 5 and it may have various configurations according to the work to be done. My present machine is designed more particularly for use in forming coils or bends of small radius which will abut as the successive bends are formed. It has been exceedingly difficult heretofore to release such bends from the form after a bend has been made, but in my present machine I overcome this difficulty by cutting away one side of the form, as indicated at 44, so that a flat face is provided about which the formed bend may be rolled so as to be easily released from the form and from the pressure jaw. This flat eccentric face 44 extends to the top of the shaft so that there is ample space for rocking the completed work to release the finished portion from the form and bring another portion of the bar or rod into position to be bent. It will also be noted, upon reference to Figs. 1 and 3, that the upper extremity of the shaft 5 is provided with two flat faces 45, so that, when a reverse bend is to be made, the form may be quickly removed from the shaft, inverted, and then again secured on the shaft, a set screw 46 being mounted in the form and adapted to be turned home against the flat face of the shaft presented thereto to secure the form in place. Just below the form, a frame bar 47 has one end fitted about the end of the shaft 5, and this bar extends outwardly from the shaft beyond the table 6 to be rigidly connected with and supported by the bench through a post 48, as shown most clearly in Fig. 2. As shown in Fig. 7, a bushing 49 is preferably fitted around the end of the shaft so as to minimize wear between the shaft and the frame bar 47. The pressure jaw 42 is supported by the frame bar 47 and it may be connected directly with means for applying pressure to the jaw and through it to the work, but when the jaw is connected directly with the pressure-applying devices, the said devices are brought so close to the shaft and the form that they interfere with the work and it has been impossible to bend coils upon such a machine. I, therefore, provide extension bars, one of which is shown at 50, and I thereby provide clearance between the jaw and the pressure-applying devices, which are indicated generally at 51, so that, as shown in Fig. 2 there is a very considerable space at one side of the work-engaging jaws which will accommodate a considerable number of coils or length of coiled bar. The bar 50 is shown in detail in Fig. 20, and it will be noted that it is constructed across its opposite ends with notches or slots 52 and 53 and is also provided with vertically disposed openings 54, 55, which extend through the end portions of the bar above and below the respective notches or slots. The jaw 42 is provided in its working face with a groove 56 of proper form to fit and partly support the bar which is to be bent, and upon its outer side, or that side which is disposed away from the form 41 and the work, is a transverse lip 57 which is adapted to fit within the notch 53 and be secured therein by screws or bolts 58 inserted through the openings 55, as will be readily understood. The bar 50 and the lower side of the jaw 42 rest directly upon the frame bar 47 so as to be supported thereby and the pressure-applying mechanism is also carried by the said bar. The outer end of the bar 50 which is constructed with the notch 52, and which is designated the outer end for convenience to distinguish between the end located nearer the point where the work is bent, connected with the pressure mechanism through an anchor block, a holder and a saddle. The anchor block is shown at 59 in Fig. 18, and comprises a body 60 adapted to rest upon the frame bar 47 immediately adjacent the outer end of the extension bar 50 and having a lip 61 on its inner side which is adapted to fit within the notch 52 in the extension bar, bolts 62 being inserted through the openings 54 and openings 63 in the said lip to firmly secure the anchor bar to the extension bar. In its opposite sides the anchor bar is provided with sockets 64 in its body portion, and these sockets are adapted to receive studs or dowels 65 and 66 upon the members of the holder. The holder is shown in detail in Fig. 4 and comprises a body 67 adapted to rest upon the frame bar 47 imediately adjacent the anchor block 59 and with its inner face abutting the outer face of the anchor block. The body 67 is provided at one end with an inwardly projecting flange 68 upon the inner face of which the dowels or studs 65 are provided. The opposite side of the body 67 is formed to lie flush with the adjacent end surface of the anchor block, and a cap block 69 is provided to fit against the said flush faces of the body 67 and the anchor block, the said cap block carrying the dowels 66, as shown clearly in Fig. 4. A stud 70 is formed on the inner face of the cap block 69 and is adapted to engage within a socket 71 formed in the coacting face of the body 67, and this stud is retained in the socket by a pin 72 inserted vertically through openings 73 and 74 provided therefor in the stud 70 and the body 67, as will be readily understood, it being noted that the opening 74 is counterbored or has an enlarged upper end 75 so as to accommodate the eye on the upper end of the pin 72 which is provided to facilitate the withdrawal of the pin when such action is necessary.

Figure 17:
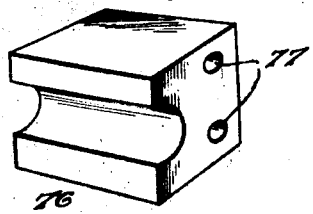
Fig. 17 is a detail perspective view of another form of jaw or work-engaging block.

It is proper to note at this point that, while my machine is intended more particularly for forming coils and the extension bar 50, is, therefore, provided to accommodate the formed coils, its usefulness is not limited to such specific work. It is possible to make a large variety of bends by the use of my machine and to bend bars or rods having various cross sectional outlines. In many kinds of work it is desirable that the work-engaging jaw be connected directly with the pressure-applying mechanism and in such instances the extension bar 50 is not employed, the work-engaging jaw being fitted in and engaged by the holder consisting of the members 67 and 69. Such a jaw, 76, is shown in Fig. 17 wherein it will be noted that sockets 77 are formed in the end portions of the jaw to be engaged by the dowels or studs 65 and 66 whereby the jaw will be firmly held in the jaw holder.

The member 67 of the jaw holder is provided on its outer side with a lug 78 adapted to fit within a recess or opening in a saddle 79 which rests directly upon the frame bar 47 and is constructed with a depending underlying flange 80 to slidably engage the edge of the said bar, as shown in Fig. 6, the upper portion of the saddle being likewise constructed, as shown at 81, to engage and overhang the edge of an upper bar 82, the said bar 82 extending longitudinally over the pressure-applying mechanism and providing a body with which securing members may be engaged so that the pressure-applying mechanism may be firmly secured upon the frame bar. Mating with the side of the saddle 79 is a cap bar or clamping plate 83 which is constructed, as shown most clearly in Fig. 6, with grooves whereby to engage the edges of the bars 47 and 82 respectively and is also provided with suitable openings to receive studs projecting from the saddle and equipped with nuts 84 whereby the parts may be properly secured upon the bars 47 and 82. A pivot pin 85 is engaged through the saddle and the lug 78 on the body 67 so that the jaw holder will be pivotally connected to the saddle. When the work-engaging jaw is carried directly by the holder, it is desirable that there be a limited capacity of the jaw to rock so as to avoid the formation of kinks and wrinkles in the work and I, therefore, provide the lug 78 and the pivot pin 85 but when the extension bar is employed, it is desirable to prevent relative rocking movement between the holder and the saddle and to that end I provide a filling block 86 which is of proper dimensions to fit within the opening or recess in the saddle against the lug 78 and be retained therein by a turn-button or latch 87 which is mounted upon the outer side of the saddle and is adapted to extend across the end of the block, as will be readily understood upon reference to Figs. 3 and 6. Upon referring to Fig. 6, it will be noted that the head of the pivot pin 85 is flush with the upper surface of the saddle, while its lower end is flush with the lower surface of the same and, consequently, it will not wear upon the frame bars 47 and 82 while it will be effectually guarded against loss by the bars.

On the outer side of the saddle, between the bars 47 and 82, is a lug 88 above and below which are disposed links 89 which are pivoted to the said lug, as will be readily understood upon reference to Figs. 2 and 3. Spaced outwardly from the saddle, an anchoring block 90 is secured to and between the bars 47 and 82, and this anchoring block is provided with vertically spaced lugs 91 on its inner side, a link 92 being pivoted at one end between the said lugs and its opposite end between the links 89, as shown in Fig. 2. It will be readily understood that movement of the links 89 and 92 out of alinement will draw the saddle and the parts connected therewith toward the anchor block while movement toward a position of alinement will serve to push the saddle and the parts connected therewith toward the form, as shown by the dotted lines in Fig. 3. The anchor block 90 fits between the bars 47 and 82 in the same manner that the saddle fits between said bars and it is secured in position by a clamping plate 93 corresponding in all respects to the cap plate 83 previously described. Nuts 94 are engaged upon studs projecting from the anchor block and turned home against the cap plate 93 to secure the anchor block in place. It may sometimes be found desirable to provide the anchor block or the saddle in such form that its upper edge will be flush with the lower surface of the bar 82 and then employ a removable flange 95 secured in any convenient manner to the saddle or the anchor block, as shown in Fig. 5, to engage over the bar 82.

The anchor block is formed with a reduced lateral extension 96 and to the upper and lower sides of this extension I secure plates 97 which extend inwardly parallel with the sides of the bars 47 and 82, and between the saddle and the anchor block, are laterally expanded, as shown at 98, openings being formed vertically through the lateral extensions or wings 98, as shown in Figs. 1, 3 and 5. Between the wings or extensions 98 of the plates 97 is disposed a disk 99 having reduced hub members 100 on its upper and lower sides fitting closely but rotatably within the openings in the said wings. Pitmen 101 are disposed above and below the plates 97 and are pivotally attached at one end to the pin 102 which forms the pivotal connection between the links 89 and 92, and at their opposite ends the pitmen 101 are pivoted eccentrically to the hubs 100 by cap screws or bolts 103, as shown in Figs. 3 and 5. A handle member or bar 104 is secured in the edge of the disk 99 and extends radially therefrom, a stop screw 105 being mounted in the outer side of the extension 96 of the anchor block in the path of the said handle bar. Upon referring to Fig. 3 more particularly, it will be noted that the several pivotal connections of the links and pitmen are so disposed that, when the parts are in the operative position shown in Fig. 3, the line of pressure connecting the pivots 102 and 103 will pass at one side of the center of the hub 100 and, therefore, any tendency of the pressure at the working point to unlock the device will tend to turn the disk 99 so that the handle bar 100 will be thrown toward the stop screw 105. The parts will, consequently, be locked in the working operative position and this point may be varied as necessity may demand or suggest by adjusting the set screw 105.

To further impart rigidity to the structure and enable the anchor 90 to resist the force applied thereto, I provide a post 106 which is similar in form to the anchor block inasmuch as it has a body portion fitting between the bars 47 and 82 and upper and lower flanges underlying the bar 47 and overlying the bar 82 respectively, a cap or clamping plate 107 being provided at opposite sides of the bars 47 and 82 and secured to the post 106 by nuts mounted on studs projecting from the post through the cap plate, as will be readily understood. Extending horizontally through the post is a threaded rod or screw 108 which has its inner end bearing against the anchor block and its outer end equipped with a hand wheel 109 whereby it may be adjusted in an obvious manner. By properly rotating the hand wheel, the adjusting screw will be turned home against the anchor block so that it may be adjusted along the bars 47 and 82 and be held firmly against outward movement along the same when the pressure-applying devices are manipulated.

The form, of course, has a groove formed therein corresponding to the outline of the bar or tube which is to be bent and, ordinarily, I provide a plurality of forms which may be used interchangeably according to the work in hand. I also provide a structure whereby the form may be quickly adapted to the work in hand without being entirely removed from the main shaft or post, and in Figs. 8 and 9 I have illustrated such a form. This adjustable or variable form includes a hub member 110 which is secured upon the upper extremity of the main shaft by the set screw 46 and has a flat side 111 and an arcuate peripheral portion 112 defining upper and lower ribs, as shown most clearly in Fig. 8. An intermediate arcuate body or plate 113 is provided which is constructed with a rib 114 at its inner edge adapted to fit between the ribs or flanges 112 of the hub portion and be secured thereto by bolts 114' inserted through the said ribs and flanges, as clearly shown in Fig. 8. The outer edge of this intermediate body is centrally grooved, as shown at 115, to receive a tongue 116 on the inner edge of a rim member 117, bolts 118 being inserted through the rib 116 and the edge portions of the intermediate body 113 to secure the parts together. The outer edge of the rim member 117 is provided with a groove 119 of a form corresponding to the work in hand, and preferably this rim member will extend through an arc of more than one hundred and eighty degrees, the intermediate body being semi-circular, as shown clearly in Fig. 9. The relative longer structure of the rim member supports the work at the end of the bend so that breakage or splitting of the work at the terminal of the bend will be avoided. This composite form will be found very advantageous when a number of bars of different cross sectional form are to be bent inasmuch as the rim member may be quickly removed and another rim member substituted therefor as the work progresses and bars of different shapes are to be bent. It will also be seen that by this arrangement it will be possible to adapt the machine to make bends of different radii without removing the entire form from the main shaft inasmuch as by merely removing the rim member the device will be adapted to produce a bend of smaller radii than that which had been employed and by removing the intermediate body 113 the hub member may be utilized as the form so as to produce bends of very small radii.

It is sometimes desirable to employ a form which will have greater resisting strength than the forms which have been described. For instance, in bending an angle bar, as shown at 120 in Figs. 11 and 12, it is necessary to firmly support both webs or branches of the bar and this cannot be done with such a form as that shown at 41 in Fig. 7 because the annular groove 121 which must be provided in the form to support the horizontal web of the bar reduces the central diameter of the form to such an extent that it does not have the requisite resisting strength inasmuch as the upper reduced extremity 122 of the shaft will then be of such small diameter that it will be easily broken. To avoid this condition, I provide the form 123 having the groove 121 to receive the horizontal web of the bar 120 as an integral part of the upper end of the shaft and to permit this form to be used interchangeably with such other forms as may be desirable, I employ the construction illustrated in Fig. 7 wherein the shaft 5 is formed centrally with a tenon 124 at its upper end and is made of such a height that it will terminate close to the upper side of the table 6. A shaft section or extension 125 is provided of the same diameter as the shaft and the form is made integral with the upper extremity of this extension, a socket 126 being provided in the lower end of the extension to fit snugly over the tenon, as clearly shown. Disposed diametrically through the tenon and the extension are tapered openings adapted to receive a tapered locking pin 127 which passes through the said openings and enters a corresponding opening 128 formed in a collar 129 which encircles the extension between the bar 47 and a collar 130 fitted around the upper end of the shaft. A set screw 131 is fitted in the collar 129 in axial alinement with the tapered pin 127 and bears against the wider end of said pin so as to hold the same in locking engagement with the said collar, the extension 125 and the tenon 124. When it is desired to change the form, the set screw is removed, whereupon the locking pin may be easily driven out and another form substituted for the one previously used.

Figure 12:
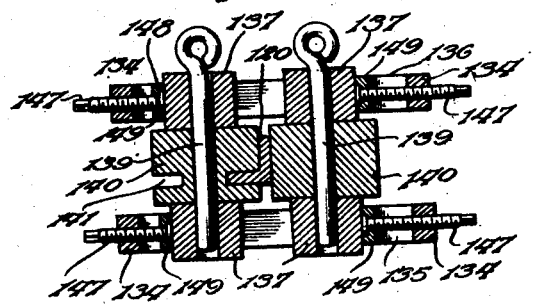
Fig. 12 is a detail section on the line 12—12 of Fig. 10.
Figure 13:
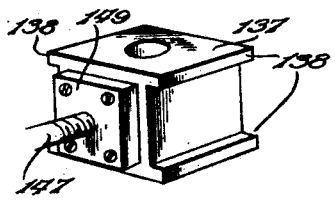
Fig. 13 is a detail perspective view of one of the bearing boxes shown in Figs. 10 and 12.
Figures 14, 15, 16:
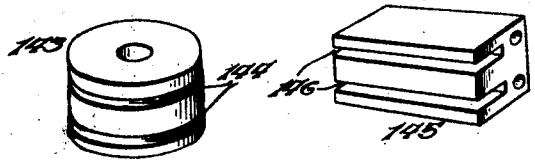
Fig. 14 is a detail perspective view of a form which may be employed in bending angle bars.
Figs. 15 and 16 are detail perspective views of work-engaging jaws which may be employed in bending angle bars.

When bending angle bars, such as shown at 120, there is a tendency of the bar to wrinkle or fold in its unbent portion adjacent the bend and to overcome this difficulty I provide the mechanism illustrated in Figs. 10, 12 and 13. The pressure jaw 42 is shown in Figs. 10 and 11 carried by a holder corresponding to the holder previously described and consisting of the members 67 and 69, the member 132 corresponding to the member 67 and the member 133 being secured to said member 132 in the same manner that the member 69 is secured to the member 67. The member 133, however, is provided with the upper and lower lateral extension plates 134 which are disposed at one side of the pressure-applying mechanism, including the bar 47, and extend inwardly or forwardly parallel therewith, as shown. The free edges of these plates 134 are constructed with recesses or slots 135 which are closed at their outer sides by keeper bars 136 secured to the edges of the plates by studs or bolts, as indicated in Fig. 10. Bearing boxes 137 are slidably mounted in the recessed edge portions of the plates 134 and are provided at opposite sides with flanges 138 which slidably engage the upper and lower surfaces of the respectively adjacent plates and keeper bars, as will be readily understood. These boxes have central vertical openings therethrough to receive pins 139 which constitute axles for rollers 140 between which the bar 120 is received and by which it is supported and guided. The periphery of one of these rollers 140 is smooth so as to bear against the vertical flange of the bar while the other roller has a groove 141 formed in its circumference to accommodate the horizontal web of the bar. These rollers are interchangeable so that they may be shifted accordingly as the horizontal web is disposed at the outer or the inner side of the bend and the form may have a smooth periphery or be grooved accordingly. The jaw 42 will also be smooth-faced or grooved accordingly as the horizontal web of the bar is presented at the inner side or the outer side of the bend, and in Fig. 16 I have shown a pressure jaw 142 having a groove 143 in its working face to receive the horizontal web of the bar. It is also possible to treat channel bars in the same manner, and in Fig. 14 I have shown a form 143 having two annular grooves 144 to accommodate the side webs or flanges of a channel bar, while in Fig. 15 I have shown a pressure jaw 145 having corresponding grooves 146 to accommodate a channel bar. Mounted in the end walls of the recessed portions of the plates 134 are adjusting screws 147 which are constructed at their outer free ends to be engaged by a wrench or other turning tool and at their inner ends are constructed with heads 148. Socket plates 149 are fitted loosely about the heads 148 and are firmly secured to the outer sides of the boxes 137 whereby a swiveled connection between the screws and the boxes is provided. By properly turning the adjusting screws, the boxes may be set closer to or farther from each other and thereby vary the spaced relation between the rollers 140 so as to accommodate bars of different thicknesses.

As has been stated, the machine is designed primarily for bending coils, and the parts are so formed so as to provide clearance space adjacent the form to accommodate the completed coils or bends. In using the form 123, however, it is desirable to provide an additional bracing element to maintain the form in upright position and resist the bending strain placed thereon. To this end, I provide the frame bar 150 which has its inner end engaged over a reduced upper extension of the form, as shown in Fig. 11, and its outer end turned downwardly, as shown at 151, beside a post or anchor 152 which is secured to the frame bar 47, as shown. A set bolt 153 is mounted in the downturned terminal 151 of the bar 150 and bears against the anchor 152 so as to secure the proper endwise adjustment of the bar. The bar 82 in this arrangement will be withdrawn and a similar but thinner bar 154 substituted therefor below the bar 150 so that the desired rigidity of the pressure-applying devices will be attained. The pressure-applying devices are identical with the pressure mechanism previously described and indicated generally by the reference numeral 51 in Fig. 2.

In bending very heavy bars or pipes, it is desirable to provide additional reinforcements for the frame of the machine and one form of such additional bracing structure is illustrated in Figs. 21, 22 and 23. When this additional reinforcement is needed, columns 155 are erected upon the outer corners of the bench and bracing arms 156 provided with eyes 157 at their outer ends are engaged over the upper ends of the said columns so as to rest on shoulders provided therefor. These arms 156 converge inwardly toward the form and their inner terminals are parallel to pass at opposite sides of the form and the upper extremity of the shaft, as shown at 158, a lug or block 159 being formed upon one bar to extend across the space between the parallel portions of the two bars and abut the mating bar. Clips 160 are fitted around the bars at the said lug so as to firmly clamp them together and cap screws 161 may be also inserted through one of the bars into the lug 159, as shown in Fig. 23, so as to firmly secure the parts together. As will be readily understood, the parallel extremities of these bracing bars extend at opposite sides of the upper extremity 162 of the form-carrying shaft, and half bearing blocks 163 are slidably disposed between and supported by the said parallel terminals of the bars so as to fit around the extremity of the shaft and provide a bearing therefor which will also aid in maintaining it against lateral strains. These half bearing blocks 163 are held to the terminal of the shaft by an adjusting screw 164 mounted in the lug 159 and a similar screw 165 which is mounted in a cap block 166 fitted to the ends of the bracing bars and secured thereto by cap bolts or screws 167, as shown clearly in Figs. 21 and 23.

A crane 168 may be mounted upon a column 169 erected upon the bench so as to facilitate the lifting and handling of very heavy work.

In Figs. 24, 25 and 26 I have shown a mounting for the pressure block which is advantageous in bending spiral coils, the rod or bar 170 to be bent being engaged between the form 171 and the jaw 172 which differ from the form 41 and jaw 42 in having their work-engaging grooves nearer their upper ends. The jaw 172 is carried by a holder consisting of members 173 and 174 corresponding in all respects to the members 67 and 69 previously described and are engaged with the jaw by dowels 175 in exactly the same manner as the members 67 and 69 engage the block 60. The jaw holder 173 is provided on its outer side with a lug 175 engaged and secured in a recess 176 in the opposed side of the saddle 177 which is constructed with a lug 178 on its outer side which is secured in the transverse groove or recess 53 in the inner end of the bar 50, the upper surface of the saddle and the cap plate 179 being flush with the uppermost surface of the bar 50 as shown in Fig. 25. At one side, the saddle is constructed with a depending reentrant flange 180 which underlies the bar 47 and slidably engages the edge of the same, while the cap plate 179 is secured to the opposite side of the saddle and is provided at its lower end with a depending reentrant flange 181 to underlie and slidably engage the adjacent edge of the bar 47. To the outer end of the bar 50 is secured the block 60 as previously described, and the holder 68, 69 and saddle 79, connect said block with the pressure-applying links.

In the operation of the machine in all its various adaptations, a work-holder, consisting essentially of jaws 35 and 36 and means for clamping said jaws securely about the bar to be bent, is arranged adjacent the form and the pressure jaw so as to receive the portion of the bar which is to be bent as it passes from and between the pressure jaw and the form, as will be readily understood. The work-holding jaws having been securely clamped against the work and the pressure-applying jaw having been firmly secured in its working position, the handle 28 is swung to one side so that the proper friction gear 23 or 24 will be brought into operative position to impart rotation to the friction wheel 9 and the shaft 5. Inasmuch as the table 6, the form and the bar 32 are fixed to the shaft and the work-holder is carried by the bar 32, the form and the work-holder will be swung in a horizontal plane about the shaft as a center and the bar to be bent will be drawn through the space between the form and the pressure jaw and will be bent about the form so that the desired arc will be produced in the bar. As has been described, generally the swinging movement will continue until the stop bar 30 strikes the trip 29, whereupon the gearing will be drawn to inoperative position and the machine will come to rest. By then swinging the handle 28 to the opposite side a reverse movement will be imparted to the machine and the work-holder and the form returned to initial position to produce a second bend. It will be understood, of course, that prior to imparting the reverse movement to the parts, the bent rod will be released from the form and the work-holder so that a sufficient length of the same may be drawn out to permit a second bend to be made at the desired point. This feeding of the work will be facilitated by the provision of the flat side of the form inasmuch as after the work-holding jaws have been disengaged from the work, the bar may be rolled about the form and the flat face of the form will define a space through which the work may roll without interference from any part of the machine.

It will be readily noted that I have provided a very compact apparatus for the stated purpose and the working mechanism is very simple while at the same time it possesses sufficient strength to effectually perform the desired operations. In my present machine there are no tracks necessary to support the moving parts and clearance is provided for a series of coils which swing with the work-holder as succeeding bends are made. Inasmuch as the work is drawn past the pressure-applying mechanism as it is bent, the liability of the bar to break or kink as it is bent is overcome and the loss of material due to this cause is minimized.

Having thus described the invention, I claim:

1. In a bending machine, the combination of an upright shaft, a form secured to the upper extremity of the shaft and comprising a hub member, an intermediate arcuate member removably secured to the hub member and projecting laterally therefrom and an arcuate rim member removably secured to the outer edge of said intermediate member, a work-holder mounted on the shaft adjacent and cooperating with said form, and means for holding work to the form.

2. In a bending machine, the combination of an upright shaft, a form removably secured to the upper extremity of the shaft and comprising a hub member having an arcuate grooved edge and a flat side, an intermediate arcuate member having a rib on its inner edge fitting within and removably secured in the groove in the hub member, the outer edge of said intermediate member being grooved, and a rim member provided with a work-engaging groove in its outer edge and having a rib on its inner edge fitting within the groove in the edge of the intermediate member and removably secured therein, means for holding work to the form, and a work-holder carried by the shaft adjacent and cooperating with the form.

3. In a bending machine, the combination of an upright shaft having a vertical tenon at its upper end, an extension fitting over said tenon and resting on the end of the shaft, the said extension and the tenon being provided with registering diametrical openings therethrough, a locking pin inserted through said openings, a collar fitting around the extension and having an opening receiving one end of the locking pin, a set screw mounted in said collar and bearing against the opposite end of the locking pin, a form carried by the upper end of the extension, means for holding work to the form, and a work-holder carried by the shaft in position to cooperate with the form.

4. In a bending machine, the combination of an upright shaft, a form carried by the upper end of said shaft, a work-holder carried by the shaft adjacent and at one side of the form, a pressure-applying jaw supported rigidly adjacent the form to hold work thereto, guide rollers supported adjacent said jaw and at the opposite side thereof from the work-holder, and means for adjusting said rollers laterally to support and guide the work.

5. In a bending machine, the combination of an upright shaft, a form carried by the upper end of the shaft, a work-holder carried by the shaft adjacent and at one side of the form, a pressure-applying device supported adjacent the form to hold work thereto, supporting elements carried by the pressure-applying device and disposed laterally with respect thereto, work-guiding and supporting rollers mounted in said elements, and means for adjusting said rollers toward or from each other.

6. In a bending machine, the combination of an upright shaft, a form carried by the upper end of said shaft, a work-holder carried by the shaft adjacent the form to cooperate therewith, a pressure-applying device supported rigidly adjacent the form to hold work thereto, supporting plates carried by said pressure-applying device and disposed at the side thereof more remote from the work-holder, said plates being provided with slotted portions at their free edges, boxes slidably mounted in said slotted portions of said plates, means for adjusting the said boxes along the slotted portions, vertical axles carried by said boxes, and rollers mounted upon said axles between the boxes to support and guide work.

7. In a bending machine, the combination of a frame including vertical columns, an upright shaft disposed within the frame, a form carried by the upper end of the shaft, a work-holder carried by the shaft adjacent and cooperating with the form, pressure-applying devices rigidly supported by the frame to hold work to the form, bracing bars having their outer ends supported on the columns of the frame and converging inwardly from said columns and terminating in parallel portions passing at opposite sides of the frame, means for securing the parallel portions of said arms together, half bearings slidably supported by and between the said parallel portions and fitting around the upper extremity of the shaft, and means for adjusting said bearings to the shaft.

8. In a bending machine, the combination of a frame including a bed plate, a bench and columns rising from the bed plate and supporting the bench, a vertical shaft mounted rotatably in the bench, means between the bench and the bed plate for rotating said shaft, a frame bar fitted loosely at its inner end about the shaft and having its outer end supported rigidly by the bench, a form secured on the shaft above said frame bar, a carrier secured to the shaft below said frame bar, a work-holder secured upon said carrier bar in position to cooperate with the form, and pressure-applying devices mounted upon said frame bar to hold work to the form.

9. In a bending machine, the combination of a frame including a bed plate, a bench and columns rising from the bed plate and supporting the bench, a vertical shaft mounted rotatably in the bench, means between the bench and the bed plate for rotating said shaft, a frame bar fitted loosely at its inner end about the shaft and having its outer end supported rigidly by the bench, a form secured on the shaft above said frame bar, a carrier bar secured to the shaft below said frame bar, a work-holder secured upon said carrier bar in position to cooperate with the form, pressure-applying devices mounted upon said frame bar to hold work to the form, a bracing bar having its inner end fited loosely about the extremity of the shaft above the frame and its outer end disposed adjacent the outer end of the said frame bar, the intermediate portion of said bracing bar passing over the pressure-applying devices, an anchor secured upon the frame bar adjacent the outer end thereof and engaged with the said bracing bar, and means cooperating with the bracing bar and said anchor to effect endwise adjustment of the bracing bar.

10. In a bending machine, the combination of an upright shaft, a form secured on the upper end of the shaft, a work-holder carried by the shaft to cooperate with the form, a frame bar fitted loosely about the shaft below the form and extending radially from the shaft, means for supporting the said frame bar rigidly, a saddle slidably fitted upon the frame bar, an anchor secured upon the frame bar and spaced outwardly from the saddle, a pressure jaw connected with the saddle to hold work to the form, pivotally connected links disposed between the saddle and the anchor and pivoted respectively thereto, a rotatable member supported from the anchor in lateral relation thereto, and pitmen pivoted eccentrically at their outer ends to the said rotatable member and having their inner ends pivoted to the pivotal connection between the said links.

11. In a bending machine, the combination of an upright shaft, a form carried by the upper end of the shaft, a work-holder carried by the shaft adjacent the form to cooperate therewith, a frame bar fitted loosely at its inner end about the shaft below the form, means for rigidly supporting the outer end of said bar, a saddle slidably mounted upon the bar, a jaw connected with the saddle to hold work to the form, an anchor secured upon the bar and spaced outwardly from the saddle, links disposed between the saddle and the anchor and pivoted together at their meeting ends and having their opposite ends pivotally attached to the saddle and the anchor respectively, bearing plates carried by the anchor, a disk rotatably mounted in and between said plates, pitmen having their outer ends pivoted eccentrically to the said disk and their inner ends pivotally connected with the meeting ends of the said links, an adjustable stop on the side of the anchor, and a handle member extending radially from the disk and adapted to abut said stop.

12. In a bending machine, the combination of an upright shaft, a form carried by the upper end of said shaft, a work-holder carried by said shaft to cooperate with the form, a frame bar fitted loosely about the shaft at its inner end below the form, means for rigidly supporting the outer end of said bar, a saddle slidably fitted upon said bar, a holder carried by said saddle and disposed between the same and the form, a work-engaging member secured in said holder whereby to hold work to the form, and means for applying pressure to the saddle.

13. In a bending machine, the combination of an upright shaft, a form carried by the upper end of said shaft, a work-holder carried by the shaft to cooperate with the form, a frame bar fitted loosely at its inner end about the shaft, means for rigidly supporting the outer end of said bar, a saddle slidably mounted upon said bar, means for applying pressure to the saddle, a holder resting upon the frame bar and comprising mating members detachably held together and defining forwardly projecting spaced portions, a work-engaging member resting upon the frame bar and fitting between the forwardly projecting spaced portions of the holder, and means for retaining said work-engaging member between the spaced portions of the holder.

14. In a bending machine, the combination of an upright shaft, a form carried by the upper end of the shaft, a work-holder carried by the shaft to cooperate with the form, a frame bar loosely mounted upon the shaft at its inner end, means for rigidly supporting the outer end of said bar, a saddle slidably mounted upon the said bar, means for applying pressure to the saddle, a holder comprising a body resting upon the bar and attached to the inner side of the saddle, said body having a forwardly projecting flange at one side and provided in its opposite side with a horizontally disposed socket and a vertical opening intersecting said socket, a cap plate fitting against the side of the body and having a tenon fitting in said socket, a pin inserted through the vertical opening in said body and through the said tenon, inwardly projecting dowels on the flange of the body and the inner end of the said cap, and a member fitted between the flange of said body and the end of the cap and engaged by said dowels and arranged to engage work and hold the same to the form.

15. In a bending machine, the combination of an upright shaft, a form carried by the upper end of said shaft, a work-holder carried by the shaft to cooperate with the form, a frame bar fitted loosely at its inner end about the shaft, means for rigidly supporting the outer end of said bar, a saddle slidably mounted upon said bar at a point remote from the form, means mounted on the bar for applying pressure to the saddle, a holder resting on the bar and connected with the saddle, an extension bar secured at its outer end in said holder and resting between its ends between the frame bar, and a jaw carried by the inner end of said extension bar to engage work and hold it to the form.

In testimony whereof I affix my signature.

JOHN S. WHEELER. [L. S.]